United States Patent [19]

Graham et al.

[11] 4,165,421

[45] Aug. 21, 1979

[54] HYDROXY TERMINATED POLYBUTADIENE BASED POLYURETHANE BOUND PROPELLANT GRAINS

[75] Inventors: William H. Graham; Inella G. Shepard, both of Huntsville, Ala.

[73] Assignee: Thiokol Corporation, Newtown, Pa.

[21] Appl. No.: 836,925

[22] Filed: Sep. 26, 1977

Related U.S. Application Data

[62] Division of Ser. No. 741,591, Nov. 15, 1976, Pat. No. 4,098,626.

[51] Int. Cl.² .................. C08G 18/32; C08G 18/62; G08G 18/69
[52] U.S. Cl. ........................... 528/75; 525/124; 528/65

[58] Field of Search ................. 526/49, 52; 528/75

[56] References Cited

U.S. PATENT DOCUMENTS 4,098,626  7/1978  Graham et al. ............... 149/19.4

Primary Examiner—William F. Hamrock
Attorney, Agent, or Firm—Stanley A. Marcus; Royal E. Bright

[57] ABSTRACT

Salicylate esters have been found to be suitable blocking agents for polyisocyanates, enabling preparation of hydroxy terminated polybutadiene based polyurethane bound propellant grains having extended pot life. Unblocking occurs readily at normal propellant cure temperatures, allowing normal cure rates.

8 Claims, No Drawings

HYDROXY TERMINATED POLYBUTADIENE BASED POLYURETHANE BOUND PROPELLANT GRAINS

This is a divisional of application Ser. No. 741,591 filed Nov. 15, 1976, now U.S. Pat. No. 4,098,626.

BACKGROUND OF THE INVENTION

This invention relates to compositions of matter classified in the art of chemistry as salicylate esters, compositions containing them, their combination with polyisocyanates, and the use of said combinations as pot life extenders for hydroxy terminated polybutadiene based polyurethanes useful as binders in propellant grains for solid fuel rocket motors.

Polyurethane binders may be used to prepare solid propellant grains with superior physical properties. It is advantageous to use hydroxy terminated polybutadienes as prepolymers for these binder systems. These prepolymers consist of a backbone of repeating polybutadiene units having terminal hydroxyls and an average molecular weight of about 3000. Additional hydroxyl functions are randomly located along the chain in such fashion that the average hydroxyl functionality per average 3000 molecular weight is in the range of from 2.1 to 2.7. The additional hydroxyl groups provide cross-linking sites necessary for firm cures, as the typical common polyisocyanates employed in the curing reaction are difunctional.

Binders may also include, in addition to prepolymers and curing agent, a plasticizer. This will be included to enhance such desirable physical properties as strain capability, softness, flexibility and the like. Plasticizers, being normally of lower viscosity than the prepolymer may also be useful in improving processing characteristics of the propellant during mixing and casting. Usually such common plasticizers as alkyl esters, for example, dioctyl adipate, or dinonyl phthalate, are employed although dual purpose materials such as n-butyl ferrocene which is also a burn rate catalyst may be employed.

The solid ingredients of the propellant will normally be an oxidizer or oxidizers, for example ammonium perchlorate, or ammonium nitrate, a metal fuel, for example, aluminum powder, and frequently a solid burn rate catalyst, for example, iron oxide. The blending, casting and curing of these propellant grains is, of course, a procedure quite familiar to those skilled in the art.

The time required for manufacture of a solid propellant grain is, of course, limited generally by factors common to all plastic resin processes, those of pot life and cure time. Pot life in this instance is practically defined as the time required for the mix to reach a viscosity in the range of about 40 Kp. After this viscosity limit is reached, defect free casting can no longer be assured. In the usual case useful pot life will be about 10 to 14 hours. The time for cure to a rubbery state which permits motor tooling removal, and finishing operation is, as would be expected, dependent upon specific formulations and cure conditions but is generally of the order of 7 to 14 days.

Pot life and cure time are dependent primarily on the speed of the reaction between the hydroxyl terminals of the prepolymer and the polyisocyanate. Excessive pot life and cure time may be shortened by the use of conventional urethane cure catalysts in the mix. Typical are such catalysts as tertiary amines, metal salts or complexes, and organo tin compounds, for example, dibutyl tin diacetate. The expedient of raising the temperature to speed cure, which might at first glance seem attractive, must be applied cautiously because of the highly energetic nature of the materials involved and the necessity of avoiding excessive strain in the cured grain caused by cool down to ambient temperature after processing. Normally temperatures in the region of 63° C. are employed for cure, and seldom, if ever, would temperatures above 76° C. be permissible.

It is more common to encounter situations where, in order to obtain a cure rate within the acceptable range, the pot life is excessively shortened. This condition may also be encountered where high solids loading produces an inherently high viscosity. Remedies for this condition are inherently more difficult to obtain. High solids loading for certain applications cannot be reduced because for high burn rates oxidizer quantity and particle size must remain invariant. Processing aids, which are generally surface active materials, may reduce viscosity slightly and lengthen pot life. An inherently fast cure reaction may be somewhat modified by additives but the solution very often is only to change to other less reactive polyisocyanates as cure reagents. These frequently are more expensive, or impart less desirable physical properties to the cured grain.

It has been known in other urethane processing areas that the reactivity of polyisocyanates may be modified by treating them with a "blocking agent" such as phenol. The reaction between the isocyanate and phenol leads to a urethane which is stable at lower temperatures but which dissociates in a reverse reaction at temperatures greater than 160° C. regenerating the isocyanate and the phenol.

Because of the temperature required for reversion it is obvious that phenol itself cannot be used as a blocking agent in the manufacture of propellant grains.

A number of modified phenols have been reported to give lower unblocking temperatures.

U.S. Pat. No. 3,317,463 teaches that the use of alkyl and aryl p-hydroxy benzoates as blocking agents will enable unblocking to occur at temperatures of from 60° to 110° C.

U.S. Pat. No. 3,798,090 teaches that nitrocellulose bound propellants are curable with isocyanates blocked with phenols substituted with "negative groups," that is, nitro, nitroso, cyano, bromo, chloro, iodo, chloromethyl, dichloromethyl, trichloromethyl, ester, keto and the like, which will unblock at appropriate cure temperatures (about 60° C.).

Marchenko et al in "Effect of the Structure of Urethanes on Their Dissociation Temperatures" in Soviet Urethane Technology Chapter 31, Technomic Publishing Co., Westport, Conn. (1973), discuss the relationship between structure and dissociation temperature of a series of monomeric urethanes of the general structure

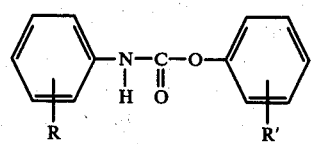

wherein R was hydrogen, ortho-, meta; or para-methyl, or para-methoxy, and R' was hydrogen, ortho-, meta-, or para-nitro, ortho-, or para-fluoro, ortho-, or para-bromo, para-chloro, or ortho-methoxy. Other compounds and parameters related to dissociation are also discussed.

There is no suggestion in any of these references that salicylate ester blocked polyurethane prepolymers will have the requisite stability within the restrictive temperature ranges suitable for polyurethane based propellant processing, while dissociating within the similarly restrictive range of temperatures suitable for their cure reaction.

SUMMARY OF THE INVENTION

The invention provides a compound of the formula:

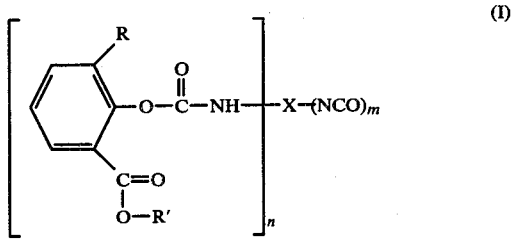

wherein X is an n+m valent organic radical; R is hydrogen, or lower alkyl of from 1 to about 10 carbon atoms; R' is lower alkyl of from 1 to about 10 carbon atoms or carbocyclic aryl of from 6 to about 10 carbon atoms; n is on the average at least 1; m is 0 or 1; and n+m must be at least 2.

The tangible embodiments of this composition aspect of the invention possess the inherent applied use characteristic of being blocked isocyanates enabling admixture of these compounds with the prepolymer, with which it is desired that the parent isocyanate cure, at normal propellant grain mixing temperatures, while postponing onset of the cure reaction until the temperature is elevated to normal propellant curing temperatures whereupon said compound dissociates, freeing said parent isocyanate allowing normal urethane cure to occur.

The tangible embodiments of this composition aspect of the invention also possess the additional inherent applied use characteristic that upon dissociation the salicylate ester so liberated is an advantageous plasticizer in the propellant grain rather than being either a volatile material or a solid, the liberation of which would tend to introduce additional stress factors in the cured grain.

The invention further provides a curable composition comprising a hydroxy terminated polybutadiene and a compound of Formula I.

The invention further provides a cured hydroxy terminated polybutadiene based polyurethane bound propellant grain wherein the binder and plasticizer comprise the reaction products of a hydroxy terminated polybutadiene with the dissociation products of a compound of Formula I.

The invention further provides a process for the control of the pot life of a curable hydroxy terminated polybutadiene based polyurethane propellant binder which comprises mixing a hydroxy terminated polybutadiene with a compound of Formula I and maintaining the temperature at about 28° C. or below.

DESCRIPTION OF THE PREFERRED EMBODIMENT

The manner of making and using the invention will now be described with reference to a specific embodiment thereof namely the preparation of 2-(carboctyloxy phenyl)-N-(isocyanato methyl benzene) carbamate (II) and its use in preparing and curing a propellant grain derived from a hydroxy terminated polybutadiene.

A salicylate ester, conveniently n-octyl salicylate and an equimolar portion of organic diisocyanate, conveniently toluene diisocyanate such as, Hylene T a toluene diisocyanate sold by DuPont Co., and a basic catalyst, conveniently triethylamine are mixed and allowed to stand at ambient temperature for a short period of time, conveniently about 1 to about 2 hours. Reaction is indicated by the still fluid mixture becoming thick. The reaction product containing principally II is suitable for use directly as a blocked curing agent.

A hydroxy terminated polybutadiene, conveniently that sold under the tradename R45M by the Arco Chemical Co., and II, are mixed at about ambient temperature, conveniently about 28° C., oxidizer, conveniently ammonium perchlorate, and if desired a cure catalyst, for example, dibutyl tin diacetate, and/or a plasticizer, for example, dioctyl adipate are then blended in while maintaining ambient temperature. After deaeration by standard techniques the mix is then cast into the desired form and cured at elevated temperature, conveniently about 63° C.

One skilled in the art would readily recognize that the general procedure illustrated for the preparation of II would be readily applicable to the other salicylate esters including 3 alkyl salicylate esters as well as the di and poly isocyanates wellknown in the art which are contemplated within the invention, all of which are either available commercially or from synthetic methods familiar to organic chemists. In addition to the toluene diisocyanate illustrated other suitable polyisocyanates include for example, isophorone diisocyanate, 4,4'-diphenyl methane diisocyanate, 4,4'-dicyclohexylmethylene diisocyanate, hexamethylene diisocyanate, 1,3,5, triisocyanate benzene and the like. Other suitable salicylate esters and 3-alkyl salicylate esters, in addition to the n-octyl salicylate illustrated are for example, ethyl salicylate, and 2-(ethyl)-hexyl-3-methyl salicylate, nonyl-3-ethyl-salicylate, and the like.

One skilled in the art will also recognize that when reacting the salicylate ester blocking agent with the polyisocyanate it will be possible to vary the proportion of the reactants so that one or more of the isocyanate groups present up to the total number present may be blocked. It will frequently be advantageous to allow one free isocyanate in the blocked curing agent as very frequently this will be less reactive and even if it does react with the prepolymer, it cannot act as a cross-linking agent. The blocking of less than all the isocyanates has the two obvious advantages of reducing cost in that less blocking agent is required, and in that less blocking agent will be released as extra plasticizer in the propellant grain upon unblocking and cure. Reaction of a free isocyanate with a hydroxyl function of the prepolymer also will aid in preventing migration of the curing agent from the mixed binder material prior to cure. It will also be apparent that, as the blocked curing agent and hydroxyl terminated prepolymer are stable to cross-linking when blended at ambient temperatures or below, master batches of propellant binder can be prepared, stored until needed, and then blended as a one component binder system with the propellant solids when required. This will allow easier processing as multiple weigh ups, and dry mixing required by addition of propellant ingredients will be eliminated.

Blocking also, of course, allows the use of isocyanates particularly the known faster reactive aromatic isocyanates such as toluene diisocyanate which themselves are too quickly reactive when mixed directly in an unblocked condition with the normal propellant compositions. Aromatic isocyanates frequently lead to cured propellant grains having superior stress and strain characteristics. Blocking of the isocyanates also greatly reduces their volatility, consequently the handling of these toxic materials is rendered safer and more simplified.

One skilled in the art would also recognize that, as the unblocking reaction may be catalyzed by various agents which also speed the cure reaction, the pot life and cure time may be controlled with considerable accuracy and varied at will over a wide range by judicious choice of catalyst, catalyst concentration and temperature. Typical catalysts may be, for example tertiary amines, dibutyl tin diacetate, iron linoleate, copper stearate, iron acetyl acetonate, calcium 2-ethyl hexanoate, and the like. Some other suitable catalysts are given in U.S. Pat. No. 3,705,119.

In addition to the R45M hydroxy terminated polybutadiene illustrated it will be obvious that any other commercially available hydroxy terminated polybutadiene will be equally suitable in the practice of the invention.

One skilled in the art will also recognize that in addition to the hydroxy terminated polybutadienes illustrated other hydroxy terminated prepolymers such as polyethers and polyesters known in the art as suitable precursors for polyurethanes will be suitable for use in the invention and are contemplated as full equivalents herein.

It will also be obvious that the above mentioned prepolymers may be end capped with polyisocyanates and that these isocyanate terminated prepolymers may then be blocked with the salicylate esters of this invention and such salicylate ester blocked isocyanate terminated prepolymers are also full equivalents contemplated within the scope of the blocked isocyanates of this invention.

The following examples further illustrate the best mode contemplated by the inventors for the practice of their invention.

EXAMPLE 1

Preparation of Blocked Isocyanates (A) Preparation of Blocked Isocyanate using a 2:1 Ratio of Salicylate Ester to Isocyanate n-Octyl salicylate (2.50 g.) is blended with toluene diisocyanate (0.87 g, Hylene T, DuPont Co.), and triethylamine (0.02 g.). After standing at room temperature for from about 1 to about 2 hours the material turns to a thick glassy liquid which is readily soluble in dichloromethane and in R45M (hydroxy terminated polybutadiene, Arco Chemical Co.).

(B) Preparation of a Blocked Isocyanate Using a 1:1 Ratio of Salicylate Ester to Isocyanate n-Octyl salicylate (2.50 g.) is combined with Hylene T (1.74 g.) and triethylamine (0.02 g.) and allowed to stand as in part A. The material thickened but was more fluid than the material from part A above. The solubility and campatibility with R45M appeared even greater than that of the material of part A.

(C) Illustration of the Preparation of a Blocked Isocyanate Using a 1:1 Ratio of Blocking Agent to Isocyanate and Employing a 3-Alkyl Salicylate as the Salicylate Ester Blocking Agent n-Octyl-3-methyl salicylate (2.64 g.) was combined with Hylene T (1.74 g.) and triethylamine (0.02 g.) under the conditions of part A above. This material also thickened but was fluid and readily soluble in R45M.

EXAMPLE 2

Curing of R45M with Salicylate Blocked Isocyanate (A) The product of Example 1A (3.37 g.) was blended with R45M (26 g.). This mixture was divided into 3 portions which were warmed at various temperatures to effect cure as shown:

| Portion | Temperature (°C.) | Time Cure |
|---|---|---|
| 1 | 60 | 7 days (soft cure) |
| 2 | 80 | overnight |
| 3 | 100 | 1.5 hours |

(B) The product of Example 1B (4.24 g.) and R45M (26.0 g.) were blended. Heating the mixture at 60° C. leads to a soft rubbery cure in 5 to 7 days. The cured product was clear and void free.

EXAMPLE 3

Effect of Catalysts on the Unblocking and Cure Reaction (A) Toluene diisocyanate (TDI) and hexamethylene diisocyanate (HMDI) were treated with ethyl salicylate by a procedure analogous to that of Example 1B. The products were then blended with R45M in a procedure analogous to that of Example 2A. 1% by weight, unless otherwise indicated, of the catalysts shown below were then blended into portions of the curing agent-R45M mix and viscosities were measured at the times indicated while maintaining the temperature at 60° C.

| Curing Agent | Catalyst | Viscosity (Kp) | |
|---|---|---|---|
| | | 1 hour | 2 hours |
| Ethyl Salicylate-TDI | None | .06 | .06 |
| " | Lead Acetyl acetonate | .18 | .40 |
| " | Copper Stearate | .96 | 2.2 |
| " | Dibutyl tin diacetate | .08 | .12 |
| " | Calcium 2-ethylhexanoate | 1.5 | 4.8 |
| " | Triethylamine | .56 | 1.0 |
| " | Ferric Acetyl acetonate | .10 | .10 |
| Ethyl Salicylate-HMDI | Dibutyl tin diacetate (0.3%) | .24 | .76 |
| " | Dibutyl tin diacetate (0.1%) | .26 | .58 |
| " | Dibutyl tin dilaurate | .32 | 1.1 |
| " | Iron linoleate | .38 | 1.5 |

-continued

| Curing Agent | Catalyst | Viscosity (Kp) | |
|---|---|---|---|
| | | 1 hour | 2 hours |
| " | Copper Stearate | 153 | Too thick |
| " | Calcium 2-ethylhexanoate | .12 | .45 |

(B) R45M based gumstocks were prepared from the 1:1 ratio blocked curing agent at the relative concentration levels of Example 2 and catalyst (1% by weight) shown, the gel times at 60° C. were as shown.

| Curing Agent | Catalyst | Gel Time |
|---|---|---|
| Ethyl salicylate-Hexamethylene diisocyanate | Copper stearate | 1.3 hr. |
| n-Octyl salicylate-Toluene diisocyanate | Dibutyl tin diacetate | 4 hrs. |
| 2-ethylhexyl 3-methyl salicylate-diisocyanate | Dibutyl tin diacetate | 4.5 hrs. |
| n-octyl-3-methyl salicylate-diisocyanate | Dibutyl tin diacetate | 8 hrs. |
| n-octyl-3-methyl salicylate-diisocyanate | Uncatalyzed | 14 hrs. |

EXAMPLE 4
Effectiveness of Dibutyl Tin Diacetate as Cure Catalyst

Gumstocks of R45M were cured at 60° C. with 1:1 n-octyl-salicylate-toluene diisocyanate or 1:1 n-octyl-3-methyl-salicylate-toluene diisocyanate at the relative concentration levels of Example 2 in the presence of 1% by weight dibutyl tin diacetate. Penetrometer readings with a 50 g. weight for 30 seconds were recorded as a function of days after mixing.

| Curing Agent | Time (Days) | Penetrometer |
|---|---|---|
| n-Octyl salicylate-toluene diisocyanate | 1 | 28 |
| n-Octyl salicylate-toluene diisocyanate | 2 | 24 |
| n-Octyl 3-methyl salicylate-toluene diisocyanate | 2 | 31 |
| n-Octyl 3-methyl salicylate-toluene diisocyanate | 3 | 29 |
| n-Octyl 3-methyl salicylate-toluene diisocyanate | 6 | 26 |

EXAMPLE 5
Stability on Storage of Various Pre-mixed Binder Formulations

Various R45M based gumstocks were prepared at ambient temperature and stored at 28° C. and 1° C. The curing agents shown were incorporated in the relative proportions of Example 2. All cure agents were 1:1 ratio of blocking agent and diisocyanate. The changes in viscosity with time of storage were measured with the results as shown:

| | | Ambient Temp. Storage |
|---|---|---|
| Curing Agent | Catalyst | Viscosity (Kp) (Days after Mixing) |
| n-Octyl 3-methyl salicylate-toluene diisocyanate | None | .34(0), .70(1), .90(2), 1.07(3), .75(4), 1.02(6), .85(7), .80(8), .93(13), 1.08(20), 1.29(45). |
| n-Octyl 3-methyl salicylate-toluene diisocyanate | (1%) Dibutyl tin diacetate | 1.04(0), 1.10(1), 1.27(2), 1.52(3), 1.07(4), 1.45(6), 1.33(7), 1.32(10), 1.79 (13), 2.54(20), 5.26(45). |
| 2-Ethyl hexyl 3-methyl salicylate-toluene diisocyanate | None | .88(1), 1.84(18). |
| n-Octyl salicylate-toluene diisocyanate | None | .20(0), .40(1), .43(2), .44(3), .54(6), .62(7), .67(13), .68(21), .78 (38). |
| n-Octyl salicylate-toluene diisocyanate | (1%) dibutyl tin diacetate | .58(0), .70(1), .80(2), .97(3), 1.68(6), 2.16 (7), 3.20(13), 7.0(21), 144(38). |
| | | 1° C. Storage |
| n-Octyl salicylate-toluene diisocyanate | None | .084(0), .60(9), .50(14), .54(19), .62(32). |
| n-Octyl salicylate-toluene diisocyanate | (1%) Dibutyl tin-diacetate | .20(0), .64(9), .54(14), .50(32). |

EXAMPLE 6
Hydroxy terminated Polybutadiene Based Polyurethane Based Propellant Formulations Propellant formulations based on R45M were prepared by blending the ingredients shown with R45M at ambient temperatures, followed by cure at 63° C. using standard techniques for all operations. The properties obtained are given:

| | | FORMULATION | | | | |
|---|---|---|---|---|---|---|
| No. | Curing Agent | NCO/OH | Catalyst | Binder | Ammonium Perchlorate (%) | Aluminum (%) |
| 1 | n-Octyl 3-methyl salicylate-toluene diisocyanate | 1.0 | Dibutyl tin diacetate | 12.0 | 88 | — |
| 2(a) | Isophorone diisocyanate | .78 | None | 12.0 | 88 | — |
| 3(b) | n-Octyl salicylate-toluene diisocyanate | 0.90 | Dibutyl tin diacetate | 14.0 | 68 | 18 |

(a)1% dioctyl adipate added as plasticizer
(b)2% dioctyl adipate added as plasticizer

| | Physical Properties | | | | | |
|---|---|---|---|---|---|---|
| Formulation | Modulus (psi) | | Strain at Max Stress | | Max Stress (psi) | |
| No. | −65° F. | 77° F. | −65° F. | 77° F. | −65° F. | 77° F. |
| 1 | 32,228 | 764 | .063 | .404 | 1006 | 108 |
| 2 | 25,704 | 1,347 | .091 | .444 | 990 | 235 |
| 3 | 9,568 | 425 | .339 | .718 | 674 | 151 |

The subject matter which applicants regard as their invention is particularly pointed out and distinctly claimed as follows:

1. A curable composition comprising a hydroxy terminated polybutadiene and a compound of the formula:

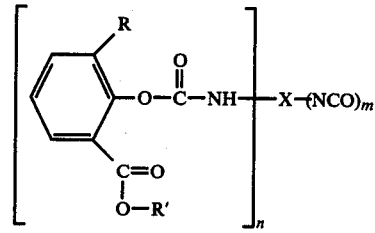

wherein X is an n+m valent organic radical; R is hydrogen, or lower alkyl of from 1 to about 10 carbon atoms; R' is lower alkyl of from 1 to about 10 carbon atoms, or carbocyclic aryl of from 6 to about 10 carbon atoms; n is on the average at least 1; m is 1; and n+m must be at least 2.

2. A curable composition as defined in claim 1 wherein X is an arylene diradical.

3. A curable composition as defined in claim 1 wherein R is hydrogen; R' is n-octyl; n is 1 and X is a methyl phenylene diradical.

4. A curable composition as defined in claim 1 wherein R is methyl; R' is n-octyl; n is 1 and X is a methyl phenylene diradical.

5. A curable composition as defined in claim 1 wherein X is a methyl phenylene diradical.

6. A curable composition as defined in claim 5 wherein R is hydrogen; R' is ethyl and n is 1.

7. A curable composition as defined in claim 1 wherein R is hydrogen; R' is ethyl; n is 1 and X is a hexamethylene diradical.

8. A curable composition as defined in claim 5 wherein R is methyl; R' is 2-ethyl hexyl; and n is 1.

* * * * *